Patented June 5, 1923.

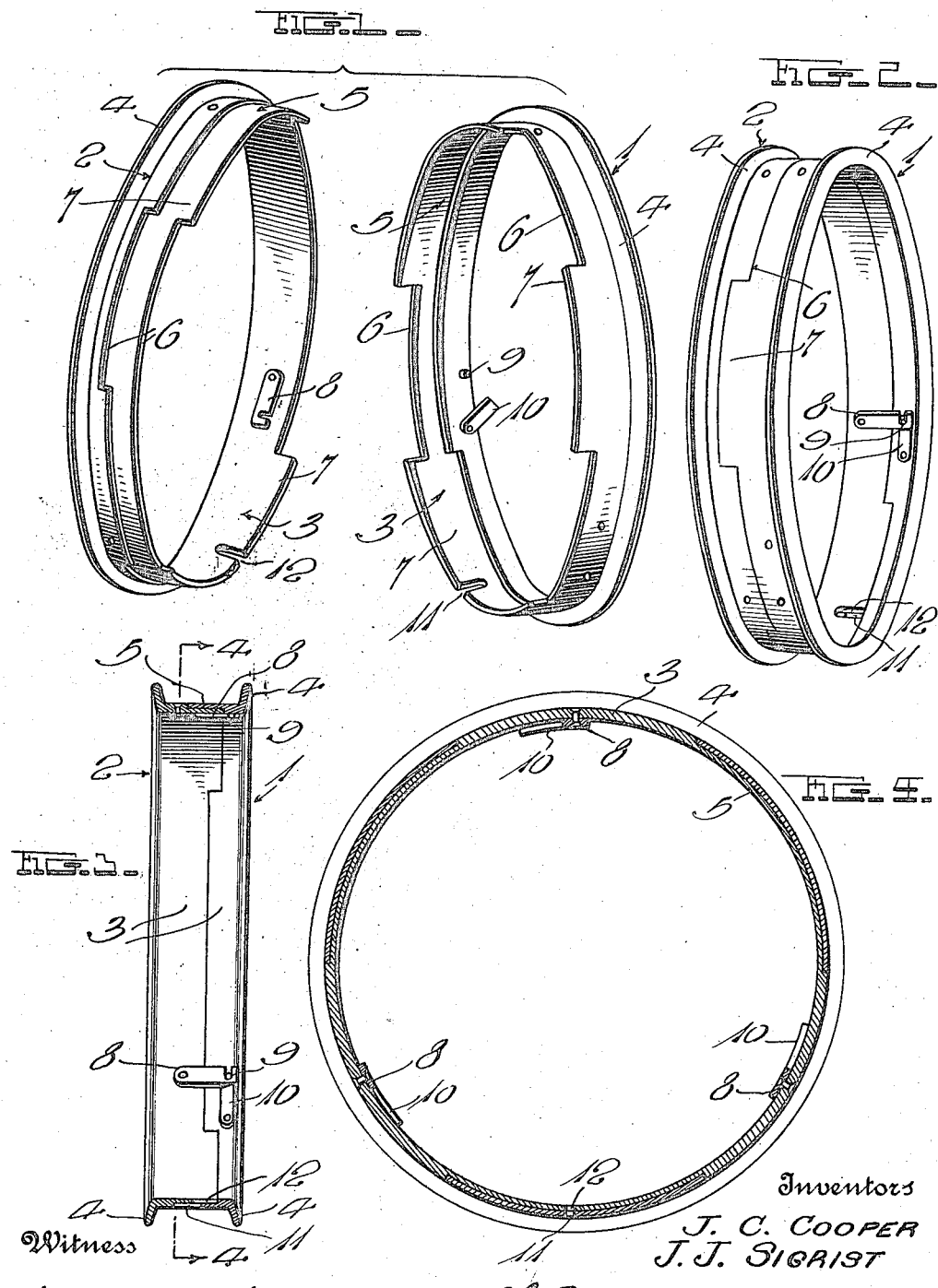

1,458,031

UNITED STATES PATENT OFFICE.

JAMES C. COOPER AND JOHN J. SIGRIST, OF ALTOONA, PENNSYLVANIA, ASSIGNORS OF ONE-FIFTH TO FRANK E. SHAFFER, OF ALTOONA, PENNSYLVANIA.

SECTIONAL TIRE-CARRYING RIM.

Application filed November 7, 1921. Serial No. 513,435.

*To all whom it may concern:*

Be it known that we, JAMES C. COOPER and JOHN J. SIGRIST, citizens of the United States, residing at Altoona, in the county of Blair and State of Pennsylvania, have invented certain new and useful Improvements in Sectional Tire-Carrying Rims; and we do declare the following to be a full, clear, and exact description of the invention, such as will enable others skilled in the art to which it appertains to make and use the same.

This invention relates to an improved demountable rim of the circumferentially split type, that is, one in which the rim is composed of two parts which are specially constructed and detachably connected with one another to facilitate application and removal of the tire.

The principal object of the invention is to generally improve upon rims of the class by providing one of extreme simplicity and durability which is practical, inexpensive to manufacture, easy to attach and detach and such in construction that quick and easy application and removal of the tire is insured.

Other objects and advantages of the invention will be apparent during the course of the following description.

In the accompanying drawings forming a part of this specification and in which like numerals are employed to designate like parts throughout the same:

Figure 1 is a perspective view of a demountable rim constructed in accordance with this invention showing the sections disconnected.

Figure 2 is a similar view showing the sections connected with one another.

Figure 3 is a sectional view taken through the complete rim to show more clearly the manner in which the sections co-act with one another.

Figure 4 is a sectional view taken substantially on the plane of the line 4—4 of Fig. 3.

In carrying out the invention, we form the improved rim of a pair of sections 1 and 2 which are of the same diameter. Each of the sections includes a base portion or ring-like part 3 which is substantially the same width as the wheel felly on which the rim is placed, and a lateral tire-engaging flange 4 disposed at the outer edge of said ring-like part and formed integral therewith. It may be conveniently stated here that although the tire-retaining flange is shown as being adapted for engagement with straight side tires, it is of course understood that it may be shaped otherwise to engage clencher or other forms of tires. It will be seen by carefully examining the drawing that the ring-like parts 3 of the two sections are of substantially the same thickness and each part is rabbeted or reduced in thickness at its inner edge as indicated at the points 5. By so constructing the rim sections, the ring-like part of one section is formed with a shoulder on its inner periphery against the free edge of the thinned portion of the ring-like part of the other section abuts, and the last named section is formed on its outer periphery with a shoulder with which the thinned portion of the ring-like part of the first named rim section engages. Hence, when the sections are arranged in operative relation, the thinned portions of the ring-like parts are disposed in overlapping relation.

It is desired to prevent relative circumferential shifting of the rim sections and although this could be accomplished in some other way, we preferably provide the abutting edges of the ring-like parts with interlocking means. By carefully examining the particular means shown, it will be seen that both the rabbets and reduced portions of the ring-like parts or base portions are formed with alternately arranged notches and projections 6 and 7 respectively, the projections of the reduced portions of the bases being designed to extend into the notches of the rabbets as shown.

To prevent separation of the rim sections when being carried on the rear end of the machine and supporting a spare tire, a plurality of pivoted latches 8 are secured to the section 2 and the notched free ends of these latches are engaged with studs 9 on the inner periphery of the ring-like part of the section 1. If deemed necessary, supplemental pivoted latches are employed for the purpose of maintaining the main latches in operative position. It is, of course, understood that the ring-like part of one section will be formed with a slot 11 for registry with a slot 12 formed in the corresponding part of the remaining section, both of these slots being adapted for registry with one another to permit passage of the tire valve therethrough.

When the rim sections are separated as indicated in Fig. 1, it will be seen that the tire can be easily and readily slipped onto the rim section 2 and the tire valve inserted through the open ended slot 12 in this section. The remaining rim section can then be engaged with the first named section and the valve slot 11 alined with the first named slot to prevent interference of the rim sections with the valve. These slots can be used as guides in insuring proper relative positioning of the projections and notches for co-action with one another. As before indicated, when a spare tire is being carried on the improved rim on the rear of the machine, the improved locking means will serve to prevent separation of the rim sections and consequent loss of the tire. Of course, when the rim is on the wheel felly, the usual clamping lugs will suffice to prevent accidental separation of the sections while the improved interlocking means will prevent relative circumferential shifting of the sections.

By carefully considering the description in connection with the drawing, persons familiar with devices of this class will doubtless be able to obtain a clear understanding of the invention. Therefore a more lengthy and detailed description is deemed unnecessary.

We claim:

A two part demountable rim, each part being endless and having a base portion and a tire retaining flange, the base portion of one part being rabbeted externally, the rabbet having alternating notches and projections, the other part being rabbeted internally and the rabbet being provided with alternating notches and projections, the two inner parts being thus made to permit the base portions to overlap and the inner free edges of each base portion being provided with notches and projections fitting the said structure of the rabbeted portions, and means to secure the parts together.

In testimony whereof we have hereunto set our hands.

JAMES C. COOPER.
JOHN J. SIGRIST.